United States Patent [19]

Reswick

[11] Patent Number: 4,652,250
[45] Date of Patent: Mar. 24, 1987

[54] VARIABLE SPEED RATIO DRIVE

[76] Inventor: James B. Reswick, 1003 Dead Run Dr., McLean, Va. 22101

[21] Appl. No.: 823,463

[22] Filed: Jan. 28, 1986

Related U.S. Application Data

[62] Division of Ser. No. 593,928, Mar. 27, 1984, Pat. No. 4,608,034.

[51] Int. Cl.[4] .............................................. F16H 9/10
[52] U.S. Cl. ...................................................... 474/52
[58] Field of Search ..................... 474/148, 49, 50, 53, 474/56, 52

[56] References Cited

U.S. PATENT DOCUMENTS

| | | | |
|---|---|---|---|
| 616,630 | 12/1898 | Pratt | 474/50 |
| 672,962 | 4/1901 | Seymour | 474/56 X |
| 698,854 | 4/1902 | Pratt | 474/53 |
| 2,004,224 | 6/1935 | Silber | 474/50 |
| 3,661,024 | 5/1972 | Cooke | 474/56 |
| 3,935,751 | 2/1976 | Lee | 474/50 |
| 3,956,944 | 5/1976 | Tompkins | 474/50 |
| 3,969,948 | 7/1976 | Pipenhagen, Jr. | 474/50 |
| 3,995,508 | 12/1976 | Newell | 474/56 X |
| 4,259,874 | 4/1981 | Guirriee | 474/56 X |
| 4,325,702 | 4/1982 | Jacobsson et al. | 474/56 |
| 4,373,926 | 2/1983 | Fullerton | 474/56 |

Primary Examiner—James A. Leppink
Assistant Examiner—Frank H. McKenzie, Jr.
Attorney, Agent, or Firm—John R. Mattingly

[57] ABSTRACT

In an automatic variable speed transmission, expansible pulleys function to change the speed ratio between driving and driven shafts. The pulleys are constructed of segments or arms that are pivoted at one end to swing outwardly. Each arm includes a V-shaped groove for receiving a V-belt. At a minimum diameter, the arms form a composite solid body and at a maximum diameter, when each arm is fully pivoted outwardly, a segmented pulley is formed. Automatic speed ratio change is disclosed in both the forward and reverse direction of rotation by proper combination of the pulleys.

10 Claims, 9 Drawing Figures

VARIABLE SPEED RATIO DRIVE

This is a divisional of application Ser. No. 593,928, filed Mar. 27, 1984 now U.S. Pat. No. 4,608,034.

BACKGROUND OF THE INVENTION

A. Field of the Invention

This invention relates to a variable speed ratio transmission that is used in the transmission of power between a motor, for example, an engine or a person, and an output shaft. The speed of the output shaft varies automatically in response to load demand such that an infinite number of speeds between the minimum and maximum are available. The transmission of the present invention includes the use of a flexible belt for transmitting rotary motion between a driving shaft and a driven shaft.

This device is intended to be used on but not limited in application to any number of low horsepower devices such as bicycles, golf carts, machine tools, and preferably wheelchairs. Also, any machine or vehicle that is requried to deliver varying torques at varying speeds may be suitable for the application of the present invention.

B. Description of the Prior Art

One of the best known devices for accomplishing variablespeed transmission through the use of a belt is the Reeves variable speed transmission. Other efforts to achieve speed change include transmissions comprising pulleys that have peripheral belt or chain engaging surfaces that expand and contract radially. U.S. Pat. No. 672,962 discloses this type of prior art device.

U.S. Pats. Nos. 616,630 and 698,854, issued to J. C. Pratt, disclose transmissions having automatic variable speed change. Automatic varying speed ratio transmissions of the prior art that include expanding pulleys do not provide a very large change in speed ratio between the minimum and maximum values. The devices of the prior art are complex and require a large assembly of parts. Also, some of the larger, more efficient transmissions are inadequate for application in low horsepower devices.

One problem shared by all belt drive transmissions is the tendency for the belt to slip. The problem is more difficult to overcome when the transmission includes an expanding pulley. Lee, in U.S. Pat. No. 3,935,751, discloses the use of an idler pulley that is spring biased for tightening the belt. The addition of an idler pulley is not advantageous since there is an additional power transmission loss due to friction. Also, the added friction results in additional belt wear. Another method of solving the problem includes using two expanding pulleys that are spring biased in opposite rotational directions as taught by Pratt.

SUMMARY OF THE INVENTION

It is an object of this invention to overcome the disadvantages of the prior art variable speed ratio transmissions.

It is a further object to provide a variable speed ratio transmission that has increased speed ratio change between the minimum and maximum values.

Another object of this invention is to provide an automatically varying speed ratio transmission for belt drives, wherein the belt tension is maintained during the speed changing operation.

It is an object of this invention to improve upon the devices of the prior art by providing an assembly that is light in weight, solid in construction, and capable of high transmission efficiency, while still being reliable, simple to manufacture, and easy to maintain with only minimal maintenance requirements.

It is a further object of this invention to provide a variable speed transmission that permits the use of smaller motors requiring less electric current, and a control system that uses fewer electrical components.

Components of the present invention may replace structurally similar components in any application where conventional "V" belts and the like are used and wherein operation of the device ranges between high speed at low torque and low speed at high torque.

A transmission constructed according to a preferred embodiment of the present invention comprises a drive pulley and and a driven pulley having a V-belt passed in a continuous band over each pulley. The drive pulley is constructed of a number of arms pinned to a central spool or hub that is in turn fixed to a shaft. Each arm is nearly identical in shape, having a radially extending arcuate portion and a curved face having a V-belt engaging groove therein. When collapsed, the arms nest together to form a typical V-groove pulley having a minimum effective diameter. As the pulley expands from the collapsed or nested position, each arm is guided by a radially extending slot or groove of an adjacent and co-planar disc that is free to rotate relative to the shaft. The arms are guided by the slots by means of pins in each of the arms.

The driven pulley of the present invention is similar in construction to the drive pulley. The drive pulley is spring biased outwardly toward a maximum expanded position. The driven pulley is not spring biased because the driving torque causes the arms to expand to whatever diameter is required to maintain belt tension. This provision of maintaining proper belt tension is provided by the novel aspects of the invention as disclosed herein.

The arm construction for each pulley is the same. However, the arms curve outwardly in opposite directions with respect to the direction of the torque applied to the pulleys. Smooth operation is maintained during the speed changing operation by the novel aspects of the expanding arms. Each curved face portion contacts the belt during one revolution of the pulley. For the nested position, full peripheral contact between the face portions and the belt are made. As the pulley expands, however, only partial contact is maintained. The area of contact along the curved face shifts from one side of the face to the other. This shifting provides for the advantage of only minimal changes in curvature for the overall pulley periphery as it expands and contracts. Additionally, the area of contact can be represented by a geometrically central point. The distance from this point to the axis of rotation defines the effective pulley radius. At the fully expanded positions, the central point of contact is furthest away diagonally from the pivot point of the arm thereby maximizing the length of the arm. Leading and trailing edges of the faces are rounded to smoothly engage and disengage the belt.

It is an object of the present invention to provide a transmission that senses an increased load present during a high load condition and automatically increases torque to the output, while only moderately increasing the input torque and reducing the input speed. It is an object of this invention, therefore, to provide a transmission to enable a motor to continuously operate at a reasonably high efficiency.

DETAILED DESCRIPTION OF THE DRAWINGS

Figure 1:
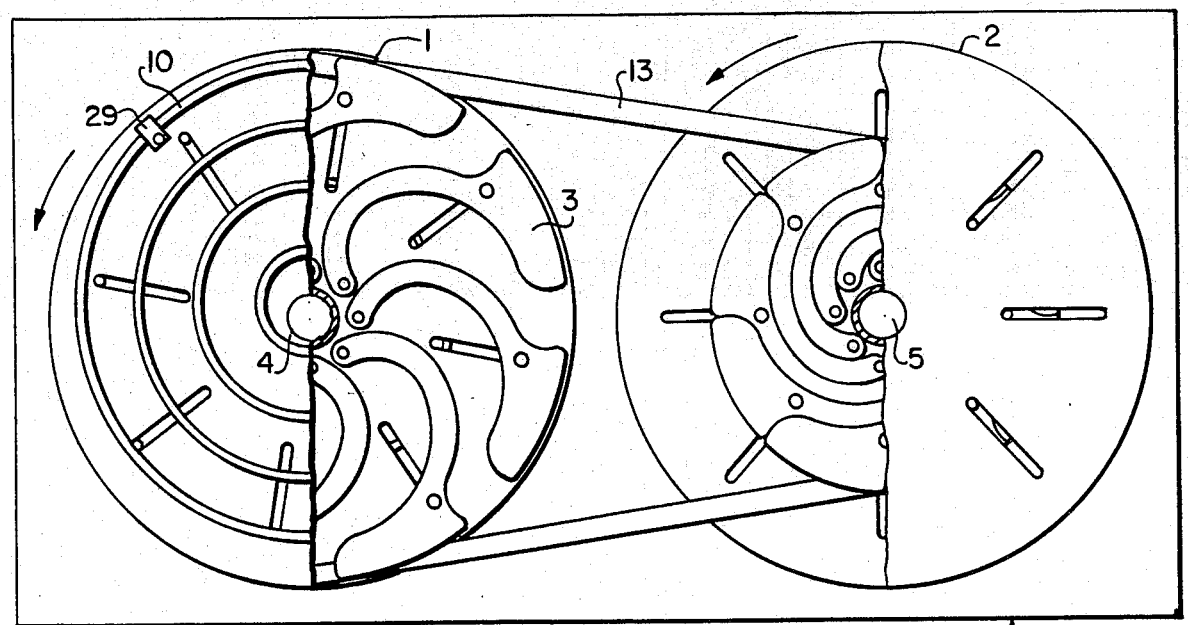
FIG. 1 is a side view illustrating the transmission comprised of a drive and a driven pulley each cut away along one diameter of the respective pulleys.

In FIG. 1, 20 generally designates one embodiment of a variable speed transmission constructed according to this invention. A drive pulley 1 is drivingly connected to a driven pulley 2 by means of a continuous flexible V-belt 13.

Figure 2:
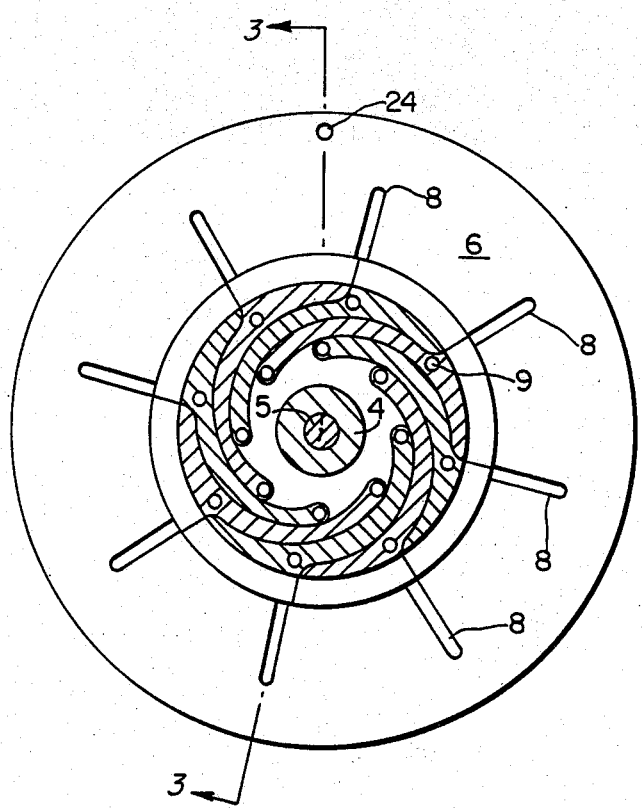
FIG. 2 is a sectional view of one of the pulleys of FIG. 1 and corresponding to line 2—2 of FIG. 3.
Figure 3:
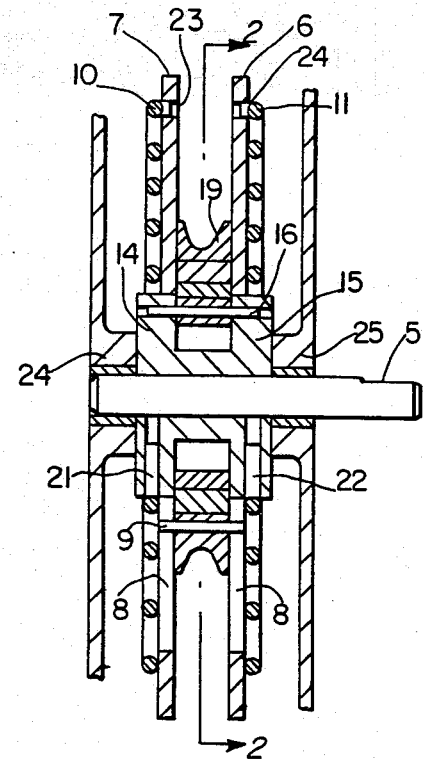
FIG. 3 is a cross-section view taken along line 3—3 of FIG. 2.

As can be seen in FIG. 1 and also with respect to FIG. 2 and 3, each pulley generally comprises an inner hub or spool 4 that is fixed to a shaft 5. As can be seen in FIG. 2, each pulley is comprised of a plurality of arms 3. Together the arms form a composite solid pulley body that is expandable to form an expanded segmented pulley body as can be seen in the left half of FIG. 1.

Spool 4 further includes two radially extending annular flanges 14 and 15. Pins 16 extend part way into each flange 14 and 15 for pivotally supporting arms 3.

Figure 4:
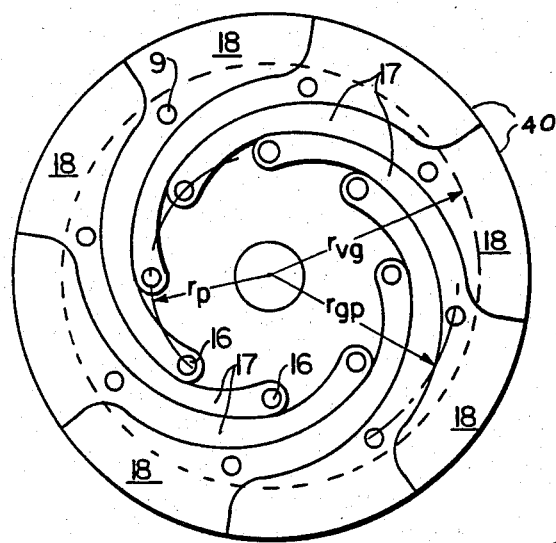
FIG. 4 is a side view showing the arm configuration of the pulley with certain details of the structure not shown.

Each arm 3 has a radially extending arcuate portion 17 and a head or end portion 18, as can be seen in FIG. 4. Each portion 18 has an outer or peripheral curved face 40 that includes a V-shaped groove 19, as seen in FIG. 3, for receiving V-belt 13. Arms 3 further have axially opposed planar surfaces only one of which can be seen in FIG. 4. Inner and outer edges of arms 3, 43, and 44, can best be seen in FIG. 5.

As shown in FIG. 3, two plates or discs 6 and 7 are mounted for free relative rotation with respect to spool 4, engaging flanges 14 and 15. One of the plates 6 can be seen in FIG. 2. Radially outwardly extending slots 8 are shown extending through plate 6. The slots 8 receive guide pins 9 that project outwardly from the axially opposed surfaces of arms 3. Slots 8 are evenly angularly spaced and the total number of slits at least corresponds to the number of arms that comprise the pulley. As seen in FIG. 3, slots 8 extend completely through plates 6 and 7, however, the slots need only be deep enough to provide a groove that pins 9 can slide in. As the arms pivot outwardly, the guide pins 9, being received in slots 8, maintain an even spacing between each of the arms. Also, the pins maintain an equal radial spacing from the axis of rotation of shaft 5. For the drive pulley only, plates 6 and 7, slots 8, and pin 9 also function at certain times to transmit torque as will be hereinafter explained.

Spiral springs 10 and 11 are anchored to flanges 14 and 15 of spool 4 within bores 21 and 22. At their other end, springs 10 and 11 are anchored by holes 23 and 24 respectively in discs 6 and 7, hole 24 being seen in FIG. 2. Driven pulley 2 is constructed nearly indentically to pulley 1 except that no springs are used in the construction of pulley 2 for reasons to be hereinafter explained.

A transmission employing a drive pulley constructed according to the embodiments of this invention is capable of automatically varying its speed-ratio in response to a sensed load condition. Initially, the drive pulley 1 is in a fully expanded position. Springs 10 and 11 are preset to apply a predetermined bias torque or force that causes plates 6 and 7 to rotate (counter clockwise as seen in FIG. 1) with respect to spool 4. This causes said arms to pivot outwardly, the arms being guided by pins 9 in slots 8. The outermost position is limited by the length of the belt and the center distance between the pulleys and not by any mechanical stops.

The predetermined spring force is chosen so as to permit the drive motor to operate in its best efficiency range without speed ratio change. In the case of a permanent magnet direct current motor, this is approximately the lower 30–40% of its torque range. As the load increases, a point is reached at which the torque on the drive pulley is enough to overcome the preset tension of the springs 10 and 11. The direction of curvature, shown in FIG. 1, with respect to the direction of rotation shown by the arrow, allows the arms to pivot inwardly as the load transmitted by the belt increases. If the load is great enough, this continues until the pulley is fully contracted. In the fully contracted position, the arms contact one another along their adjacent peripheries. Further, each portion 18 abuts an adjacent portion 18 in an end-to-end manner so that a fully circular pulley face is formed broken only by the small spaces between each arm.

A transmission employing a driven pulley constructed according to the embodiments of this invention is capable of varying its diameter in response to changes in diameter of the drive pulley between a fully contracted position and a plurality of expanded positions. Such a transmission could be constructed with a drive pulley of any known expanding type in which the pulley diameter decreases in response to a sensed load. Preferably, the drive pulley is constructed according to the embodiments of this invention as shown in FIG. 1.

The driven pulley responds to increase its diameter in proportion to a decrease in diameter of the drive pulley. This is caused by the action of a belt pulling force pulling on arms 3 in a sense that tends to constantly urge the arms to pivot outwardly. The force is transmitted through frictional engagement of the belt with the arms and the tendency for the arms to pivot outwardly is caused by the direction of curvature of the arms with respect to the direction of the torque applied by the belt. In FIG. 1, it can be seen that the belt applies a torque in the direction of the arrow shown, thus urging the arms of the driven pulley to pivot outwardly. The arms of the driven pulley are allowed to pivot outwardly with guidance of plates 6 and 7 rotating with respect to spool 4. They can pivot outwardly as far as it is necessary in that there are no mechanical stops preventing the outward movement of the arms.

When the torque of the load is decreased and the drive pulley diameter again expands, the driven pulley is caused to contract by the same force that causes the drive to expand. In the transmission of FIG. 1 the force is produced by springs 10 and 11 and this force is transmitted to the driven pulley through the belt. Since no springs are present in the driven pulley construction, the arms of the driven pulley pivot inwardly in response to the force transmitted by the belt from the drive.

As stated, it is a preferred embodiment, the transmission of this invention employs both a drive pulley constructed according to this invention and a driven pulley constructed according to this invention.

Transmission of power in the drive pulley begins with a drive torque exerted on shaft 5. This power is transmitted through springs 10 and 11 to plates 6 and 7. Then power transmission continues through slots 8 to pins 9 of arms 3. The springs act as a transmission element in series with the shaft and the arms. As the pulley contracts, power is still transmitted through the spring. When the drive pulley is in the contracted position it transmits power, not through the springs but through the hub, to each of the individual arms pivoted on the hub. In the contracted position the drive pulley transmits power much in the same way a solid pulley does.

Transmission of power is different for the driven pulley. The arms 3 pinned to hub 4 always act to transmit the power to the hub and hence to the output shaft. For the driven pulley, the plates 6 and 7, the pins 9 in slots 8 transmit no working power for the pulley. These elements serve to only guide the pulley arms in pivotal movement inwardly and outwardly.

Therefore, pins 9 are referred to as guide pins, but for the drive pulley they also act to transmit power from the shaft to the arms when the pulley is in any of its expanded postions. Also, this is not to say that no force is transmitted to the hub from the pivot connections of the arms when the drive is in the expanded positions. This merely states that no working force is transmitted through the pivot connections until the drive contracts and the arms contact one another along their adjacent peripheries.

An initial minimum belt tension is provided by springs 10 and 11. This pulls the belt tightly against the driven pulley that is fully contracted or in a nested position. When the speed change occurs, the torque of springs 10 and 11 is overcome and the arms of the drive pulley pivot inwardly. As this takes place the belt pulls at the individual arms 3 of the driven pulley. This is achieved through a belt pulling force that acts upwardly from the bottom of the driven pulley in a circular direction toward the top of the driven pulley. This tendency for the belt to pull arms 3 upwardly causes the arms to pivot outwardly.

Referring to the transmission of FIG. 1, for the direction of rotation opposite to that of the direction shown by the arrows, no torque speed conversion is achieved, However, the initial belt tension permits the system to transmit power in the opposite rotational direction as the torque directions in this rotational condition in combination with the direction of curvature of the arms in the drive and driven pulleys tend to expand drive pulley 1 and to maintain driven pulley 2 in a contracted or nested position. This tendency of the driving torque to expand the drive pulley ensures that the belt does not slip when operating in the opposite rotational direction.

Figure 9:
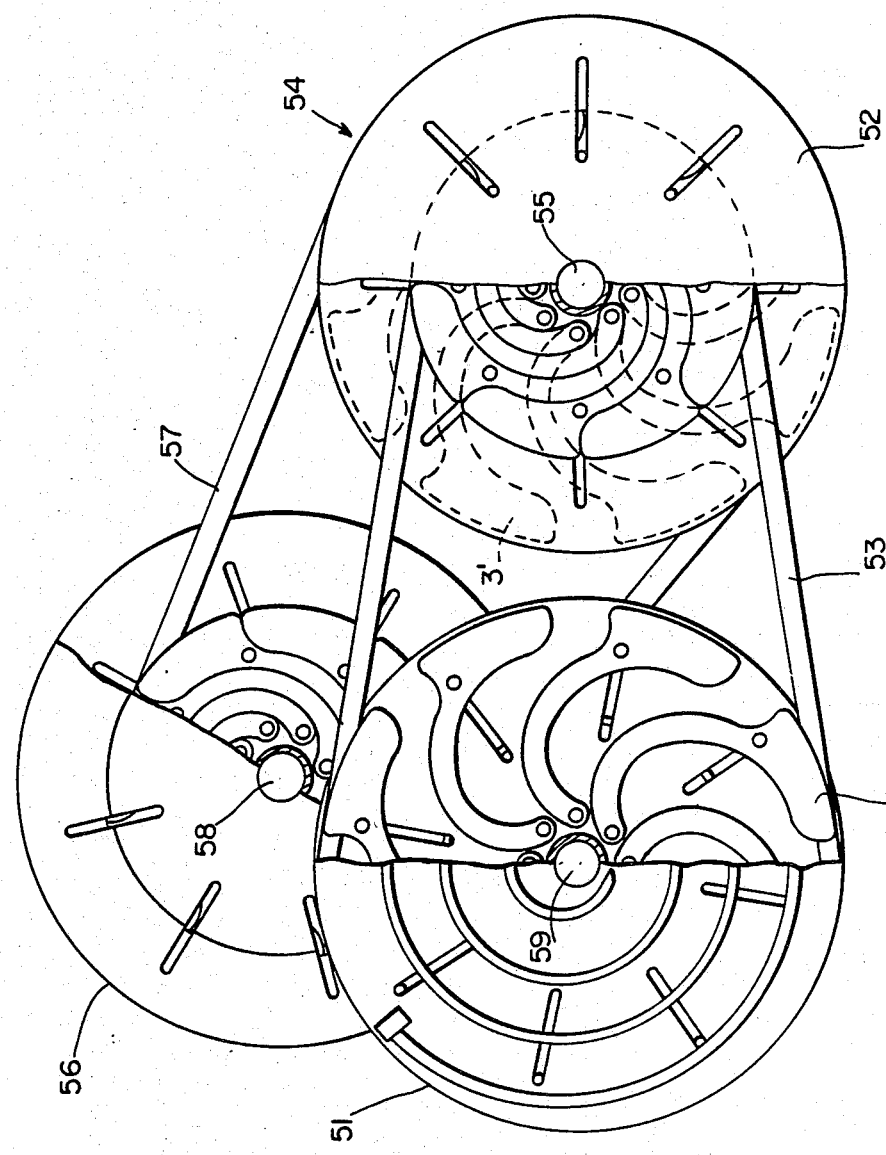
FIG. 9 shows a side view of two transmission pairs operable to provide automatic variable speed in either rotation direction.

In FIG. 9, a transmission of another embodiment is constructed according to this invention. In this transmission, the direction of rotation is the same as in FIG. 1 and each pulley component part is structurally similar to the pulleys detailed in FIGS. 2 and 3 wherein the drive pulleys include springs and the driven pulleys do not. A first drive pulley 51 is connected for rotary transmission to a first idler or driven pulley 52 by means of a V-belt 53. A second drive pulley 54 is fixed to a shaft 55 that is common to both pulleys 52 and 54. Drive pulley 54 has arms 3' shown by dotted lines, arms 3' being oriented oppositely to arms 3. Only pulley 52 can be seen in FIG. 4. Shaft 55 is mounted for rotation by suitable means not shown. Pulley 54 is connected for rotary transmission to output pulley 56 by means of a second V-belt 57. Pulley 56 is mounted on a shaft 58 that is intended to provide the output torque as it is transmitted originally from shaft 59, on which pulley 51 is mounted.

In the operation of the transmission constructed according to FIG. 9, pulleys 51 and 52 act as pulleys 1 and 2 do in FIG. 1 to provide a change in speed ratio, while the pulleys 54 and 56 transmit rotary motion at a fixed speed ratio. In the reverse direction, pulleys 54 and 56 act to automatically change the speed ratio as pulleys 51 and 52 previously did. In the reverse direction, pulleys 51 and 52 transmit speed at a fixed speed ratio in that the pulley arms of pulley 52 will be in a completely collapsed position and the pulley arms of pulley 56 will be in a completely expanded position. Therefore, speed-torque conversion is provided in both rotational directions for shafts 58 and 59.

In FIG. 4, the geometry of each pulley used in the transmissions constructed according to the embodiments of the invention is shown. $r_{vg}$ indicates the radius of a circle joining the depths of the V groove in each head portion 18 of arms 3. $r_{gp}$ shows the radius of a circle that joins the central point of each guide pin 9. $r_p$ shows the radius of a circle than joins the central point of each pins 16.

Figure 5:
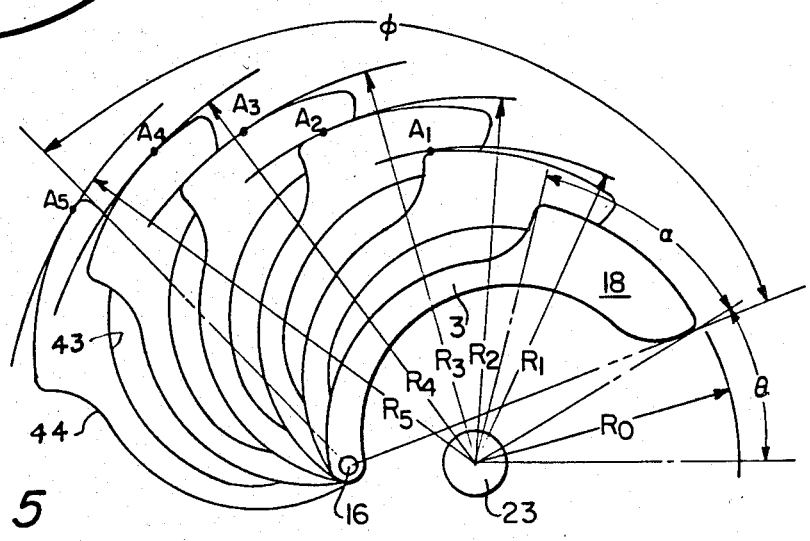
FIG. 5 illustrates several intermediate positions of one pulley arm as it expands between the collapsed position and the fully expanded position.

In FIG. 5, points $A_1$–$A_5$ show the central points of contact of a V-belt with the arms as the arms move from the collapsed position through several intermediate positions to the fully expanded position. It can be seen that each point $A_1$ through $A_5$ is tangent to a circle having its origin at 23. The maximum pulley diameter is indicated by radius $R_5$ and the minimum pulley diameter is indicated by the radius $R_0$. Theta indicates the initial angular displacement of head portion 18 from a line intersecting pivot point 16 of arm 3 with the axis of rotation of the pulley. Alpha indicates the angular fraction of a full circle that each head portion 18 of an arm 3 subtends. Phi indicates the angle through which head portion 18 extends from the nested position to the fully extended position as measured from the point of rotation at 16. In a preferred embodiment of this invention, phi equals approximately 115 degrees.

In the preferred embodiment $r_p$ equals (0.47) $R_0$, and ($R_5/R_0$) equals (1.8). Also, theta equals 30 degrees. For the preferred pulley construction having eight arms, alpha equals 45 degrees.

According to the improved pulley construction provided by this invention, for each intermediate position of an arm 3 as it pivots outwardly from the collapsed position to the expanded position, a central point of tangency is maintained along the outer peripheral rim of head portion 18. Since this point of tangency shifts gradually across the outer peripheral rim portion of head 18 from left to right as viewed in FIG. 5, sudden changes in curvature are minimized. Also, a significant increase in speed ratio change is provided by the solid construction of the arms, specifically in combination with the solid interconnection of the semi-circular face portions 18 with the radially extending arcuate portions 17. FIG. 5 clearly shows that an arm in a first position (having radius $R_1$) has a central point of contact (point $A_1$) with the belt that is diagonally nearest to the arms's pivot point 16. As the arm pivots outwardly the central point of contact shifts along the periphery of the curved face to the diagonally furthest point, $A_5$, from pivot 16. In theory, the arm could support the belt at the corner of the V groove nearest point $A_5$ if the arm were allowed to pivot for a value of phi equal to 180 degrees. It can be seen from the figure that a smaller diameter pulley would be formed if the belt were in contact with the middle point of portion 18 rather than contact point $A_5$. This increase in maximum pulley diameter results in a 4% to 5% overall diameter increase per pulley.

For low horsepower applications, arms 3 can be constructed of any suitable plastic material or lightweight metal such as aluminum or an alloy thereof. In the preferred embodiment, eight arms are used such that portions 17 of arms 3 are sufficiently thick to support the component of belt force that is directed toward the pivot point 16. Theta, shown in FIG. 5, could be decreased at the expense of thinning portions 17 and lengthening those portions also. This would permit an increase in phi. The benefit in maximizing phi is realized in a greater speed ratio change; and in minimizing the angle phi, a greater ability for the arms to transfer the applied torque without excessive stress to portions 17 of the arms.

Each of the pulleys in FIGS. 1 and 9 are constructed similarly with identical arms and plates. Hub designs of the drive and driven pulleys differ in detail to account for the springs on the drive pulley and lack of springs on the driven. The springs serve to retain the plates on the drive pulley while alternative well-known means are used to retain the plates on the driven.

Although a V-belt has been disclosed throughout the prior discussion, a properly guided flat, round, or other shape belt may be used as determined by power transmission requirements. Additionally, arms may be constructed with multiple belt grooves and multiple belts used to transmit higher power than could be accomplished with a single belt.

Figure 6:
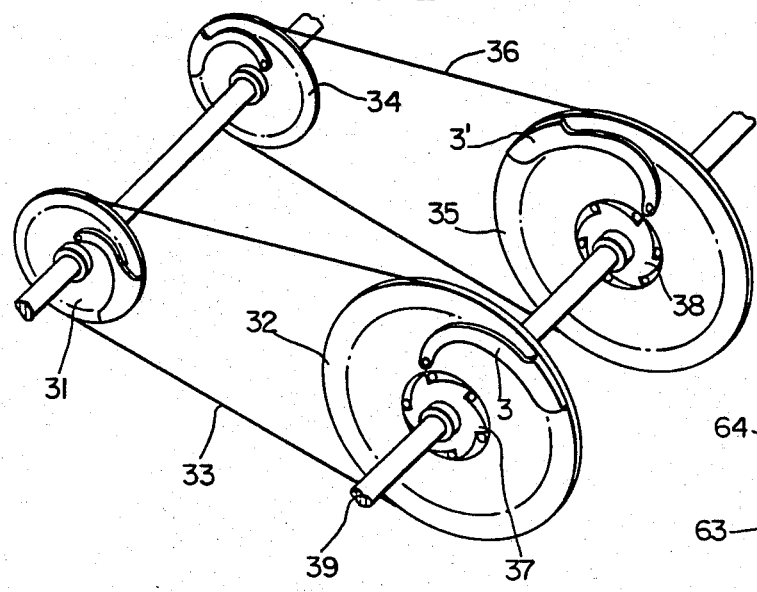
FIG. 6 shows a perspective view of two transmission pairs constructed according to the invention, and operable to provide automatic variable speed in either rotational direction.

In FIG. 6, the use of two pair of pulleys is shown so that speed change in the reverse direction is also possible. A first pair of pulleys 31 and 32 have a first V-belt 33 passing over them. A second pair of pulleys 34 and 35 are similarly connected by a V-belt 36. Pulleys 32 and 35 are connected to the drive shaft through over-running clutches. The elements of the first drive pulley 32 are in mirror image with the elements of the second drive pulley 35. This is indicated by the reversely oriented over-running clutches 37 and 38 and the reversely oriented arms 3 and 3' of the drive pulleys. In the forward direction clutch 37 engages and pulley 35 can rotate at only the same or a slower speed than pulley 32 and will therefore over-run freely. Pulleys 31 and 32 will provide variable speed in a forward direction. In the reverse direction, clutch 38 engages and pulley 32 can rotate at only the same or slower speed than pulley 35 and therefore will over-run freely. Pulleys 34 and 35 will provide variable speed in the reverse direction.

Figure 7:
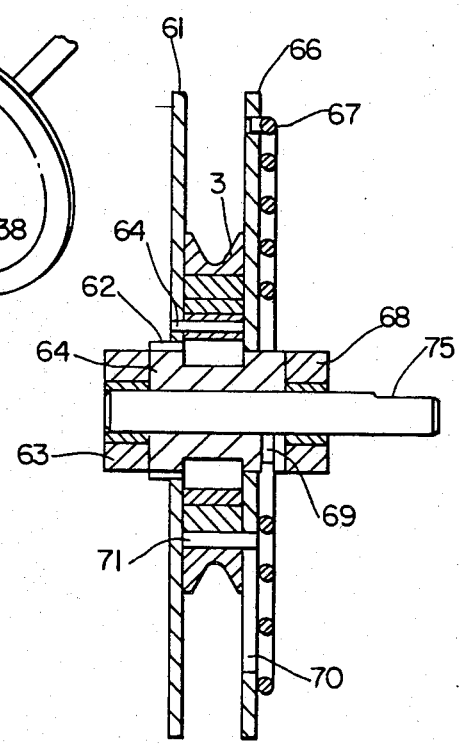
FIG. 7 illustrates another embodiment of a pulley constructed according to this invention.

FIG. 7 shows another embodiment of a pulley in which a shaft 75 is provided. A spool 64 is fixed to shaft 75 and keyed at 62 is a disc 61 that is fixed for rotation with spool 64. A second disc 66 is provided that is mounted on spool 64 for free relative rotation therewith. A spring 67 is anchored at its one end to disc 66 and at its other end to spool 64 in bore 69. Slots 70 are provided in disc 66 for receiving pins 71 that project outwardly from one face of arms 3. The arms are mounted for pivotal movement with respect to disc 61 by pins 64. Collars 63 and 68 function similarly to collars 24 and 25 in FIG. 3.

Figure 8:
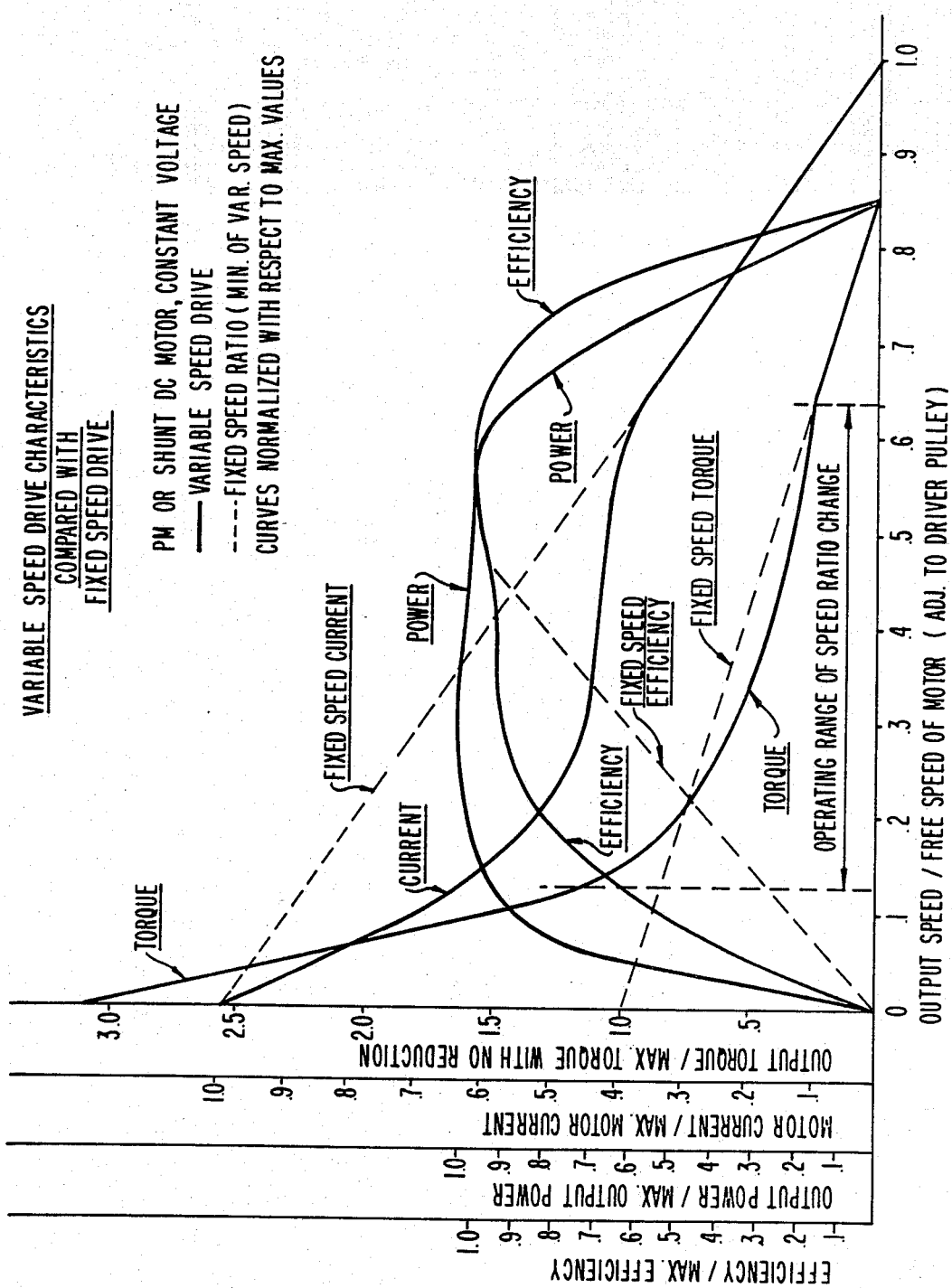
FIG. 8 is a graph of the characteristics of a torque convertor constructed according to the invention as compared with the characteristics of a fixed pulley of normal construction.

FIG. 8 discloses a graph comparing the torque conversion and other characteristics of the transmission constructed according to the present invention with the fixed pulley characteristics of a solid pulley constructed according to a known manner. Curves are typical for use of the variable speed drive with a fractional horsepower permanent magnet (or shunt field) direct current motor. Initial spring tension is set to a preload of about 30% of motor maximum torque as measured at the drive pulley and a spring rate is chosen to collapse the drive pulley arms completely at about 80% of maximum motor torque as measured at the drive pulley. All scales are nondimensional being referred to the maximum values of each variable plotted except for torque which is referred to maximum output torque measured at the driven pulley were initial speed ratio to remain unchanged. Curves were experimentally obtained using a 0.1 horsepower motor. The substantial increase in torque, power, and efficiency at low speeds as compared with the system operating at fixed speed ratio may be observed. Reduced motor current over the normal operating range may also be observed. Lower current and higher efficiency results in smaller electrical components as well as increased performance with the same energy capacity.

Obviously, many modifications and variations of the present invention are possible in light of the above teachings. Thus, it is to be understood that within the scope of the appended claims, the invention may be practiced then as specifically described.

What is claimed is:

1. A variable speed ratio transmission system comprising:

a drive pulley having means to mount said drive pulley for rotation and a driven pulley having means to mount said driven pulley for rotation;

said pulleys each having annular drive surfaces to mount an endless flexible transmission belt passed over said pulleys for transmitting torque from said drive pulley to said driven pulley;

means for varying the diameter of said drive pulley annular drive surface between an expanded position and a plurality of contracted positions including means for constantly biasing said drive pulley toward said expanded position and means for contracting said drive pulley to said plurality of contracted positions from said expanded position against said biasing means in response to a torque exceeding a predetermined torque applied to said driven pulley and transmitted to said drive pulley through the belt;

means for varying the diameter of said driven pulley annular drive surface between a contracted position and a plurality of expanded positions; and means for expanding said driven pulley to said plurality of expanded positions in response to a decrease in diameter of said drive pulley;

said biasing means producing a belt force being transmitted to said driven pulley through the belt; and said diameter varying means of said driven pulley causing said driven annular surface to contract toward said contracted position from said expanded positions solely in response to said belt force.

2. The transmission according to claim 1, wherein said driven pulley comprises:

said means for varying the diameter of said driven pulley annular drive surface including a plurality of arms of unitary construction, each of said arms having first and second ends, a radially extending arcuate portion interconnecting said ends, and a drive surface portion at said second end suitable for accommodating the belt;

hub means including means for pivotally connecting each of said arms near said first end to said hub means at equal angularly spaced positions along the periphery of said hub means;

said contracted position including said arms contacting one another along their adjacent peripheries and further including each said drive surface portion of each of said arms abutting an adjacent said drive surface portion of the adjacent one of said arms in an end-to-end manner to form an annular drive surface having a minimum pulley diameter;

said expanded positions including said plurality of arms pivoting outwardly to form a segmented annular drive surface having a pulley diameter greater than said minimum diameter; and means for guiding the pivoting of said arms inwardly and outwardly between said contracted position and said expanded positions.

3. The transmission according to claim 2, wherein said drive pulley comprises:

said means for varying the diameter of said drive pulley annular drive surface including a plurality of arms of unitary construction, each of said arms having first and second ends, a radially extending arcuate portion interconnecting said ends, and a drive surface portion at said second end suitable for accommodating the belt;

hub means including means for pivotally connecting each of said arms near said first end to said hub means at equal angularly spaced positions along the periphery of said hub means;

said contracted position including said arms contacting one another along their adjacent peripheries and further including each said drive surface portion of each of said arms abutting an adjacent said drive surface portion of the adjacent one of said arms in an end-to-end manner to form an annular drive surface having a minimum pulley diameter;

said expanded positions including said arms pivoting outwardly to form a segmented annular drive surface having a pulley diameter greater than said minimum diameter; and means for guiding the pivoting of said arms inwardly and outwardly between said contracted position and said expanded positions.

4. The transmission according to claim 3, further comprising:

said arm having axially opposed surfaces;

each of said guiding means of said drive pulley and said driven pulley including plate means mounted for free relative rotation with respect to said hub means adjacent at least one of said opposite surfaces;

a plurality of pins, each of said plurality of arms having at least one of said pins projecting from at least one of said opposite surfaces; and said plate means including a plurality of radially extending slots such that each of said pins is suitable for being received within one of said slots for maintaining equal spacing between said arms as said arms pivot inwardly and outwardly.

5. The transmission according to claim 3, wherein each said drive surface portion of said drive pulley includes a continuous curved face portion for engaging the belt; and each said face of each of said arms abutts one another in said end-to-end manner to comprise a pulley in said contracted position having a fully continuous circular pulley face for engaging the belt.

6. The transmission according to claim 5, wherein said drive pulley comprises:

a contact portion between the belt and each said face portion, said contact portion having a geometrically central point;

said contact portion having a length equal to the length of each said face portion when said arms in said contracted position, and said contact portion having a length less than the length of each said face portion when said arms are in said expanded positions such that the diameter of said pulley defines the distance between a geometrically central point along said face portion of one of said arms and an opposed said geometrically central point of said face portion of a radially opposite one of said arms.

7. The transmission according to claim 6, wherein each said geometrically central point is tangent to a circle having its origin at said axis of rotation and being constructed from the set of said geometrically central point for each of said expanded positions.

8. The transmission according to claim 2, wherein each said drive surface portion of said driven pulley includes a continuous curved face portion for engaging the belt; and each said face portion of each of said arms of said driven pulley abutts one another in said end-to-end manner to comprise a pulley in said contracted position having a fully continuous circular pulley face for engaging the belt.

9. The transmission according to claim 8, wherein said driven pulley comprises:

a contact portion between the belt and each said face portion, said contact portion having a geometrically central point;

said contact portion having a length equal to the length of each said face portion when said arms are in said contracted position, and said contact portion having a length less than the length of each said face portion when said arms are in said expanded positions such that the diameter of said pulley defines the distance between a geometrically central point along said face portion of one of said arms and an opposed said geometrically central point of said face portion of a radially opposite one of said arms.

10. The transmission according to claim 9 wherein each said geometrically central point is tangent to a circle having its origin at said axis of rotation and being constructed from the set of said geometrically central points for each of said expanded positions.

* * * * *